Aug. 7, 1934.  W. M. MALISOFF  1,968,843
TREATMENT OF SLUDGE
Filed Aug. 22, 1932
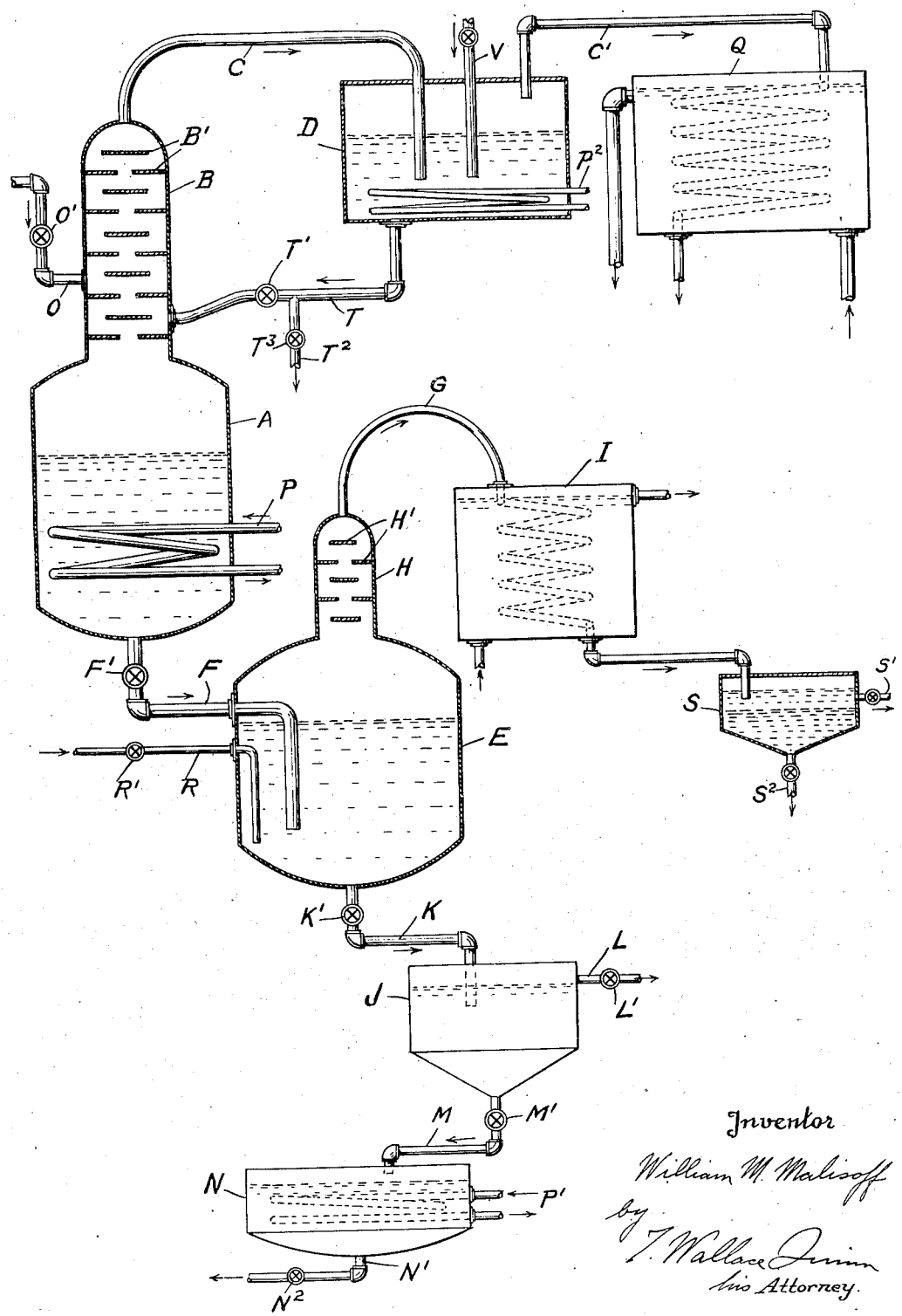
Inventor
William M. Malisoff
by
T. Wallace Ginn
his Attorney.

Patented Aug. 7, 1934

1,968,843

UNITED STATES PATENT OFFICE 1,968,843

TREATMENT OF SLUDGE

William M. Malisoff, Philadelphia, Pa., assignor to The Atlantic Refining Company, Philadelphia, Pa., a corporation of Pennsylvania Application August 22, 1932, Serial No. 629,836

9 Claims. (Cl. 196—148)

The present invention relates to the treatment of by-products of mineral oil refining and more particularly refers to the separation into useful components of a mineral oil sludge.

When a mineral oil, particularly a petroleum fraction, is treated with one or more agents of the character of those referred to in my copending application, Serial No. 493,064, filed on November 3, 1930, or with equivalent agents, whereby mercaptans or compounds of a like nature are reacted with and/or removed, a tarry sludge results which contains the treating agent, the impurities in dissolved and/or converted form, and a certain amount of occluded or dissolved oil. As agents which may be employed in lieu of sodium hydroxide in methyl alcohol, the preferred agent, my above identified copending application discloses that the alkaline component of the treating agent may be an alkali hydroxide or carbonate, an alkoxide of the alkali or alkaline earth metals, ammonia, onium bases, or equivalent alkaline substances, or mixtures of two or more of said substances; and the organic solvent component of the treating agent may comprise monohydric alcohols, polyhydric alcohols, ketones, halogen hydrins, or mixtures of two or more members of the several groups, and more specifically, methyl, ethyl, propyl, and isopropyl alcohols; glycols and glycerine; acetone, ethyl-methyl ketone and diethylketone; and epichlorhydrin. The term "caustic methanol" will be used hereinafter, in a generic sense, to refer to agents of the character of those which include the above or similar compounds.

Caustic methanol sludge, by my process, is separated for the recovery of its valuable constituents. My invention will be described, by way of illustration, and without imparting limitation, in connection with the treatment of caustic methanol sludge, particularly that obtained in the treatment of light petroleum fractions with a solution of sodium hydroxide in methyl alcohol. The major products obtained by my process are (1) a mixture of the solvent component of the treating agent and oil, (2) crude mercaptans, and (3) aqueous alkali and tarry material. Ordinarily, the mixture of oil and solvent need not be further separated, since as such it may be used for treatment of oil wherein ordinarily the solvent by itself is employed. The crude mercaptans may be further purified, as by distillation, or may be used as such, as odorants, or for other purposes. The aqueous alkali may be used as such or after being concentrated, for purposes where such material is commonly used. Summarily, my process contemplates recovering the solvent together with dissolved hydrocarbons by distillation at a temperature below the decomposition temperature of the mercaptides in the sludge, then raising the temperature and hydrolizing the mercaptides to mercaptans, and, at the same time, distilling off the mercaptans, as for example, by injection of a current of steam. The residue consists of a solution of alkali together with some tarry matter, and these may be readily separated, for example, by gravity.

To illustrate my process, and apparatus which may be employed in carrying it out, reference is had to the accompanying drawing, in which:

A designates a still with which a fractionating or reflux column B is associated, the latter communicating through conduit C with scrubber D. Reflux column B contains baffles B' therein. Still A is connected with a steam still E by conduit F, through which flow of fluid is controlled by valve F'. Vapors from still E pass to condenser I through conduit G, the still preferably having an extended, vertical reflux portion H containing baffle members H'. Liquid is conducted from the lower part of still E to separator J through conduit K, controlled by valve K'. Separator J has outlets L and M leading from its upper and lower portions respectively, outlet L, controlled by valve L', leading to storage (not shown), and outlet M, controlled by valve M', leading to evaporator N. Evaporator N is equipped with a coil P', through which a heating medium may be circulated, and with an outlet pipe N', controlled by valve $N^2$.

Caustic methanol sludge to be treated, may be admitted to still A through conduit O, controlled by valve O', which communicates with an intermediate point in the reflux column B. Efficiency is thus obtained in separating the more volatile light oil and methanol components from the less volatile components of the sludge. Still A is heated to a temperature not to exceed substantially 150° C., by a heating medium passed through coil P located at a point adjacent the bottom thereof. Vapors pass from the reflux column B through conduit C, thence through a scrubbing liquid, such as heated caustic soda solution, in scrubber D, the scrubbing liquid being maintained at a suitably high temperature to prevent any substantial condensation of methanol or light oil therein, by means of a heating fluid passed through coil $P^2$, which extends into scrubber D below the level of the scrubbing liquid. If desired, the flow of heating fluid through the coil $P^2$ may be thermostatically controlled (by means not shown) to maintain the scrubbing liquid at a sufficiently high temperature to prevent any substantial condensation therein of the vapors being scrubbed. This scrubbing action removes sulfur compounds carried over with the distillate of light oil and methanol. From the scrubber D, the scrubbed vapors are passed to condenser Q through conduit C', and from such condenser, a liquid product in the form of a solution of methanol, containing some light oil, flows.

Spent scrubbing liquid containing sulfur impurities may be conducted from scrubber D, through conduit T, controlled by valve T', to a desired point in column B, or may be withdrawn from the system through conduit T², controlled by valve T³, which communicates with conduit T, or a part may be introduced into column B and a part withdrawn from the system. If passed into column B, the spent scrubbing liquid becomes subjected to the several treatments being carried out in stills A and E, and eventually will be recovered along with the caustic contained in the sludge undergoing treatment. Fresh scrubbing liquid may be supplied to scrubber D through valve controlled pipe V.

Components of the caustic methanol sludge which were not volatilized from still A, settle to the bottom thereof, and are withdrawn, either continuously or intermittently, through conduit F, whereupon they are passed into steam still E, wherein sulfur components containing mercaptides are subjected to steam distillation at temperatures above substantially 150° C. Open steam is introduced into still E through conduit R, controlled by valve R', under conditions of pressure or superheat sufficient to bring its temperature above substantially 150° C. Under these conditions, the mercaptides present are hydrolized to the form of mercaptans which are volatilized and pass as vapors through conduit G to condenser I wherein they are liquefied. The condensed liquid mixture may be passed to separator S which may, for example, be a simple gravity separator, wherein a two-layer system forms, the crude mercaptans forming an upper layer and the water with dissolved impurities forming a lower layer. The liquid mercaptans and/or the water may be continuously or intermittently withdrawn from the separator, the one from the upper part thereof through the conduit S¹, and the other from the lower part through conduit S², each of which conduits is controlled by a valve.

The material in steam still E which is not vaporized by the steam distillation, is withdrawn from a point adjacent the bottom of the still through conduit K, and introduced into separator J. This withdrawal and introduction into separator J will be continuous or intermittent depending upon whether the process is being run as a batch process or as a continuous process. The fluid material introduced into separator J comprises a mixture of caustic alkali, water and tar. The amount of water present will depend upon the temperature maintained in the steam still E and its volume may be kept down by suitably high temperatures in still E. In the separator J, the solution of caustic alkali and water will form a lower layer and the tarry components will form an upper layer which may be withdrawn through conduit L and made use of as a low grade bituminous material; for example, it may be used as a fuel, tar binder, etc. The aqueous caustic alkali solution may be removed from the separator through conduit M and may be used in such concentration, or, if desired, may be conducted to evaporator N, heated by any suitable means, for example, by steam or other hot fluid passing through coil P', wherein the caustic solution may be concentrated as desired. The concentrated caustic solution may be withdrawn from the lower part of evaporator N, through line N', controlled by valve N².

It will be seen that the almost useless agglomerate of impurities and treating agent, herein designated as caustic methanol sludge, may, by my process, be converted into several useful products. The caustic alkali, which in the treatment of the oils with caustic methanol, united with mercaptans to form mercaptides, in accordance with my process, is recovered, and the sulfur compounds are reconverted to the more useful mercaptan form.

The temperatures in still A and in still E are controlled in order to get the desired separation, and in order to make the subsequent steps of purification most economical. I have found that if a temperature of substantially 150° C., is exceeded in still A, considerable amounts of sulfur impurities will distill over with the methanol and light oil. If the scrubbing step of my process, which is optional, is omitted, contamination may result; on the other hand, if the scrubbing step is employed, excessive temperatures in still A will cause the scrubbing solution to become spent relatively quickly. To make possible the use of a lower distilling temperature in still A, and accordingly a less rapid rate of contamination of scrubbing liquid, still A may be maintained under vacuum, by means well known in the art. Again, in the distillation which takes place in steam still E, it is desirable that the temperatures employed be above 150° C., and preferably not higher than 300° C., in order that substantially the sulfur compounds only, particularly, the mercaptans, may be removed without being contaminated with the more volatile of the components of the tarry fractions.

Illustrative of changes which may be made within the scope of my invention, in place of heating and fractionation by means of still A and reflux column B respectively, the sludge may be heated in a separate heating means and then introduced into a fractionating or reflux column at an intermediate point therein, thus obtaining the desired separation without the need of a steam coil, such as steam coil P. Other changes and modifications of like and obvious nature may be made in my process and/or apparatus without departing from the spirit and scope of my invention.

For brevity, in the appended claims, the term "caustic methanol" is to be understood to comprehend a solution of at least one of the group of compounds comprising oxides, alkoxides, hydroxides and carbonates of the alkali or alkaline earth metals, ammonia and onium bases, in at least one organic solvent from the group comprising monohydric alcohols, polyhydric alcohols, halogen hydrins and ketones or mixtures of two or more members of the group, which reagent when contacted with a hydrocarbon oil containing sulfur impurities, will form sludge therewith by absorption and/or reaction.

My invention is not to be considered as specifically restricted to the exemplary apparatus shown nor to specific details of process herein given by way of example.

What I claim is:

1. A process for the recovery of valuable components from a sludge resulting from treatment of mercaptan-containing hydrocarbon oils with a solution of an alkaline compound in an organic solvent, which comprises heating the sludge to a temperature sufficient only to volatilize the organic solvent, removing the volatilized solvent from the portion of the sludge which remains unvolatilized, and thereafter subjecting said unvolatilized portion to the action of steam to effect hydrolysis of components thereof and distillation of hydrolyzed components.

2. A process for the recovery of valuable components from a sludge resulting from the treatment of mercaptan-containing hydrocarbon oils with a solution of an alkaline compound in an organic solvent, which comprises heating the sludge to a temperature sufficient only to volatilize the organic solvent, maintaining the sludge at such temperature until a substantial part of the organic solvent is volatilized, removing the volatilized solvent from the portion of the sludge which remains unvolatilized, thereafter subjecting the unvolatilized portion of the sludge to the action of a hydrolyzing agent to effect hydrolysis of components thereof, and distilling off at least some of the components so hydrolyzed.

3. A process for the recovery of valuable components from a sludge resulting from the treatment of impure hydrocarbon oils with a solution of an alkaline compound in an organic solvent, which comprises removing the organic solvent from the sludge by heating to a temperature sufficient only to cause volatilization thereof, passing the volatilized solvent into and through a washing liquid at a temperature sufficiently high so that no substantial condensation of the solvent will take place, thereby removing impurities from the solvent, thereafter condensing the solvent, subjecting the residual portion of the sludge to the action of a hydrolyzing agent, and removing therefrom portions hydrolyzed.

4. A process for treating a mercaptide-containing sludge resulting from contacting a mercaptan-containing hydrocarbon oil with caustic methanol, which comprises heating the sludge to a temperature below the decomposition temperature of the mercaptide content of the sludge, distilling off the methanol under the temperature conditions aforesaid, and subjecting the portion of the sludge which remains unvolatilized to steam distillation at higher temperatures, thereby to hydrolyze mercaptides to the mercaptan form, and removing from the portion of the sludge which remains unvolatilized as a result of the steam distillation, components thereof so hydrolyzed.

5. A process for the recovery of valuable components from a sludge resulting from contacting an impure hydrocarbon oil with a solution of an alkaline compound in an organic solvent, which comprises heating the sludge to the volatilization temperature of the organic solvent, maintaining the sludge at such temperature until a substantial part of the organic solvent volatilizes, removing the volatilized organic solvent from the portion of the sludge which remains unvolatilized, and subjecting said unvolatilized portion to steam distillation at a higher temperature to effect hydrolysis of components thereof, removing therefrom components so hydrolyzed, and separating to substantial extent alkaline compounds from the residue.

6. A process for the recovery of valuable components from a sludge resulting from contacting an impure mercaptan-containing hydrocarbon oil with caustic methanol, which comprises heating the sludge to a temperature below substantially 150° C., and maintaining the sludge at such temperature until a substantial part of the methanol is volatilized and driven off, then subjecting the unvolatilized portion of the sludge to steam distillation at a temperature in excess of substantially 150° C., and removing the portion thereof which volatilizes as a result of the latter treatment, from the portion which remains unvolatilized.

7. A process for the recovery of valuable components from a mercaptide-containing sludge formed by contacting an impure mercaptan-containing hydrocarbon oil with caustic methanol, which comprises heating the sludge to a temperature below substantially 150° C., separating the portion of the sludge which vaporizes from the portion that remains unvaporized, increasing the temperature of the unvaporized portion, subjecting the unvaporized portion at such increased temperature to steam distillation thereby to hydrolyze mercaptides to mercaptans and to vaporize portions of the sludge, separating portions so vaporized from the residual non-vaporized portion of the sludge, and separating said residual non-vaporized portion into tar and caustic alkali components.

8. In a process for the recovery of valuable components from a mercaptide-containing sludge formed by contacting an impure mercaptan-containing hydrocarbon oil with caustic methanol, the steps which comprise heating the sludge to a temperature sufficiently high to volatilize the methanol and lower boiling hydrocarbon oils, said temperature being below that at which substantial decomposition of mercaptides will occur, and subjecting the non-vaporized portion of the sludge to steam distillation, the temperature of the non-vaporized portion of the sludge during such steam distillation being held sufficiently high so that substantially all of the steam introduced in the said non-vaporized portion, separates therefrom as vapor.

9. A process for the recovery of valuable components from a mercaptide-containing sludge formed by contacting an impure mercaptan-containing hydrocarbon oil with caustic methanol, which comprises heating the sludge to a temperature sufficiently high to volatilize the methanol and lower boiling hydrocarbon oils, said temperature being below that at which substantial decomposition of mercaptides will occur, subjecting the non-vaporized portion of the sludge to steam distillation, the temperature of the non-vaporized portion of the sludge during such distillation being held sufficiently high so that substantially all of the steam introduced into the non-vaporized portion separates therefrom as vapor, allowing the liquid residue from the distillation last mentioned to stand, whereby caustic alkali settles to the bottom and a layer of tarry material forms above the alkali, and withdrawing the tar from the alkali.

WILLIAM M. MALISOFF.